United States Patent
Choi et al.

(10) Patent No.: US 8,081,697 B2
(45) Date of Patent: Dec. 20, 2011

(54) DETECTION COMPLEXITY REDUCING APPARATUS AND METHOD IN MULTIPLE INPUT MULTIPLE OUTPUT (MIMO) ANTENNA SYSTEM

(75) Inventors: Soong-Yoon Choi, Suwon-si (KR); Kyung-Joo Suh, Seoul (KR); Young-Hoon Kwon, Seongnam-si (KR); Sung-Soo Hwang, Suwon (KR); Jong-In Kim, Suwon (KR); Yong-Seok Kim, Suwon (KR); Hyun-Cheol Park, Daejeon (KR); Hyoun-Kuk Kim, Ulsan (KR)

(73) Assignees: Samsung Electronics Co., Ltd., Suwon-si (KR); Research and Industrial Cooperation Group, Daejeon (KR)

( * ) Notice: Subject to any disclaimer, the term of this patent is extended or adjusted under 35 U.S.C. 154(b) by 1259 days.

(21) Appl. No.: 11/746,459

(22) Filed: May 9, 2007

(65) Prior Publication Data

US 2007/0263569 A1    Nov. 15, 2007

(30) Foreign Application Priority Data

May 9, 2006   (KR) .................. 10-2006-0041461

(51) Int. Cl.
*H04L 1/02* (2006.01)
(52) U.S. Cl. ........ 375/267; 375/260; 375/262; 375/316; 375/340
(58) Field of Classification Search .................. 375/260, 375/267; 370/310, 328–329, 334, 395.4, 370/464
See application file for complete search history.

(56) References Cited

U.S. PATENT DOCUMENTS

| | | | |
|---|---|---|---|
| 2002/0122501 A1 | 9/2002 | Awater et al. | |
| 2004/0047438 A1 | 3/2004 | Zhuang et al. | |
| 2005/0265477 A1 | 12/2005 | Takeda et al. | |
| 2006/0209978 A1* | 9/2006 | Jungnickel et al. | 375/267 |
| 2006/0233280 A1* | 10/2006 | Tynderfeldt et al. | 375/299 |
| 2007/0047552 A1* | 3/2007 | Astely | 370/395.4 |
| 2008/0075022 A1* | 3/2008 | Lei et al. | 370/310 |
| 2009/0034637 A1* | 2/2009 | Hoshino et al. | 375/260 |

FOREIGN PATENT DOCUMENTS

JP    2005-184779    7/2005

OTHER PUBLICATIONS

Yuanbin Guo; McCain, D.; , "Reduced QRD-M detector in MIMO-OFDM systems with partial and embedded sorting," Global Telecommunications Conference, 2005. GLOBECOM '05. IEEE, vol. 1, pp. 187-192, Nov. 28-Dec. 2, 2005.*

Yuanbin Guo; McCain, D.; "Reduced QRD-M detector in MIMO-OFDM systems with partial and embedded sorting," Global Telecommunications Conference, 2005. GLOBECOM '05. IEEE, vol. 1, pp. 187-192, Nov. 28-Dec. 2, 2005.*

* cited by examiner

*Primary Examiner* — Khanh C Tran
*Assistant Examiner* — Eboni Hughes
(74) *Attorney, Agent, or Firm* — Jefferson IP Law, LLP

(57) ABSTRACT

An apparatus and method for lowering a tree searching complexity in a Spatial Multiplexing (SM) Multiple Input Multiple Output (MIMO) antenna system are provided. A transmitting apparatus includes a generator for generating a plurality of transmit streams by spatial-multiplexing a transmit data, a determiner for determining modulation schemes to be applied to the plurality of the transmit streams respectively and a modulator for modulating the plurality of the transmit streams using at least two modulation schemes under control of the determiner. The receiver detects the signals by allocating the modulation scheme of the lowest order to the upper tree level.

30 Claims, 6 Drawing Sheets

DETECTION COMPLEXITY REDUCING APPARATUS AND METHOD IN MULTIPLE INPUT MULTIPLE OUTPUT (MIMO) ANTENNA SYSTEM

PRIORITY

This application claims the benefit under 35 U.S.C. §119(a) of a Korean patent application filed on May 9, 2006 in the Korean Intellectual Property Office and assigned Serial No. 2006-41461, the entire disclosure of which is hereby incorporated by reference.

BACKGROUND OF THE INVENTION

1. Field of the Invention

The present invention relates generally to an apparatus and method for reducing detection complexity in a Multiple Input Multiple Output (MIMO) antenna system. More particularly, the present invention relates to an apparatus and method for lowering tree searching complexity of a receiver in a MIMO antenna system using a spatial multiplexing scheme.

2. Description of the Related Art

Recently, the wireless mobile communication market has grown rapidly. As the market has grown, demand has increased for various multimedia services in the wireless environment. In particular, demand is rising for increased mass transmission data capacity and rapid data delivery. In response to this rising demand, there is a need to find a method of efficiently using the limited frequencies. One proposed response is the use of a new transmission technique using a multi-antenna. By way of example of the new transmission technique, a Multiple Input Multiple Output (MIMO) system using a multi-antenna is being used.

A MIMO technique, which uses a multi-antenna at a transmitter and a multi-antenna at a receiver, can increase the channel transmission capacity in proportion to the number of the antennas. Such a technique increases the channel transmission capacity without using additional frequencies and without requiring additional transmit power allocation, as compared to a system using a single antenna. Thus, in recent years, active research has been conducted on the MIMO technique.

Multi-antenna techniques are divided largely into a spatial diversity scheme, a Spatial Multiplexing scheme and a combination scheme. The spatial diversity scheme improves the transmission reliability by acquiring a diversity gain corresponding to the product of the number of transmit antennas and the number of receive antennas. The Spatial Multiplexing (SM) scheme increases the data rate by transmitting a plurality of signal streams at the same time. The combination scheme is a combination of the spatial diversity and the SM schemes.

In the Vertical Bell Labs Layered Space-Time (V-BLAST) scheme, which is a representative SM scheme, a transmitter sends independent data on a plurality of antennas. Generally, when a receiver in a V-BLAST system adopts a Maximum Likelihood (ML) detection scheme, optimal performance can be obtained. However, the ML detection scheme has an extremely high complexity and therefore hinders or even disables its implementation. As alternatives to the ML detection scheme, a chase coding scheme and a QR Decomposition based M (QRD-M) scheme have been suggested. These schemes are less complex than the ML scheme yet approach the performance of the ML scheme. However, those systems are still highly complex and also face difficulty in being applied to an actual system.

The chase decoding scheme is a detection scheme which combines an Ordered Successive Interference Cancellation (OSIC) scheme and a List scheme. After first determining a signal to be detected, the chase decoding successively rejects interference by generating a list of the determined signal by the modulation order. A transmit vector is generated by the modulation order at each stage. A distance is measured between the transmit vectors and the received signal and the transmit signal is determined as the shortest vector between the receive signal and the transmit vectors.

The QRD-M scheme generates a triangular tree through the QR decomposition on the channel. The number of tree levels corresponds to the number of transmit antennas, and the number of branches extendible from a point of the level to a next level is determined by the modulation order. The QRD-M scheme searches the tree down to the lowest level while leaving M-ary branches at each level. When the M value is equal to the modulation order used in the system, performance close to the ML scheme is attained.

As discussed above, since the SM system, such as V-BLAST, transmits the independent data in parallel, the structure of the transmitter is quite simple. However, if the receiver detects the signals using the ML scheme, a Euclidean distance (or Euclidean metric) for $M^{N_t}$-ary vectors (M is the modulation order and $N_t$ the number of antennas of the transmitter) needs to be computed. Because the complexity of the computation increases exponentially, its actual implementation is substantially impossible. In the chase decoding scheme and the QRD-M scheme, which detect the signal with lower complexity than the ML scheme, the list size and the M value need to be the same as the modulation order of the transmitter to acquire the ML performance. In this case, complexity makes their implementation impossible as well.

Accordingly, when using an SM scheme, the system requires low complexity and performance close to the ML scheme.

SUMMARY OF THE INVENTION

The present invention has been made to substantially address at least the above problems and/or disadvantages and to provide at least the advantages discussed below. Accordingly, an aspect of the present invention is to provide an apparatus and method for lowering a detection complexity of a receiver in an SM system.

Another aspect of the present invention is to provide an apparatus and method for lowering a tree search complexity of a receiver in an SM system.

A further aspect of the present invention is to provide an apparatus and method for a transmitter to apply different modulation schemes to streams transmitted on a plurality of transmit antennas in an SM system.

A further aspect of the present invention is to provide an apparatus and method for a receiver to receive data of different modulation orders and search from the data of the low modulation order in an SM system.

A further aspect of the present invention is to provide an apparatus and method for determining a set of modulation orders to be applied to a plurality of transmit streams in an SM system.

A further aspect of the present invention is to provide an apparatus and method for determining a modulation order set and a power weight set to be applied to a plurality of transmit streams in an SM system.

In accordance with an aspect of the present invention, a transmitting apparatus in an SM communication system is provided. The transmitting apparatus includes a generator for generating a plurality of transmit streams by spatial-multiplexing a transmit data, a determiner for determining modulation schemes to be applied to the plurality of the transmit streams respectively and a modulator for modulating the plurality of the transmit streams using at least two modulation schemes under control of the determiner.

In accordance with another aspect of the present invention, a receiving apparatus of an SM communication system is provided. The receiving apparatus includes a receiver for receiving a modulation scheme set applied to a plurality of streams from a transmitting apparatus and a detector for allocating a modulation scheme of a lowest order, among modulation schemes of the modulation scheme set, to a first tree level, allocating modulation schemes of higher orders to remaining tree levels, and estimating a transmit vector by detecting signals received on a plurality of antennas using the tree.

According to another aspect of the present invention, a method for transmitting in an SM communication system is provided. The method includes generating a plurality of transmit streams by spatial-multiplexing a transmit data, determining modulation schemes to be applied to the plurality of the transmit streams respectively and modulating the plurality of the transmit streams using at least two determined modulation schemes.

According to a further aspect of the present invention, a method for receiving in an SM communication system is provided. The method includes receiving a modulation scheme set applied to a plurality of streams from a transmitting apparatus, allocating a modulation scheme of a lowest order, among modulation schemes of the modulation scheme set, to a first tree level, and allocating modulation schemes of higher orders to remaining tree levels and estimating a transmit vector by detecting signals received on a plurality of antennas using the tree.

BRIEF DESCRIPTION OF THE DRAWINGS

The above and other objects, features and advantages of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method for reducing a tree searching complexity of a receiver in a communication system using a Spatial Multiplexing (SM) scheme. As discussed earlier, an SM scheme can increase system capacity, without requiring additional system bandwidth, by transmitting different data on different transmit antennas at the same time. A representative example of an SM scheme is the Vertical-Bell Laboratory Layered Space-Time (V-BLAST) scheme.

An exemplary tree searching method includes two important features. First, the number of branches searched at the upper tree level greatly affects the entire performance, while the number of branches searched at the lower level does not exert as great an influence on the performance. Second, a Near-Maximum Likelihood (ML) receiver (e.g., QR Decomposition based M (QRD-M) receiver) needs to search as many branches at the upper tree level as the number of transmitter modulation orders to approach the ML performance. Accordingly, if the number of branches to be visited at the upper tree level is reduced by allocating a symbol of the lower modulation order to the upper tree level, the complexity can be lowered and performance close to the ML scheme can be achieved.

In an exemplary embodiment, to decrease the number of branches at the upper tree level and relatively increase the number of lower branches, different modulation schemes are assigned to antennas of a transmitter for the same spectral efficiency. In an exemplary embodiment, a receiver detects the symbol of the low modulation order at the upper tree level and detects the symbol of the higher modulation order at the lower tree level.

Figure 1:
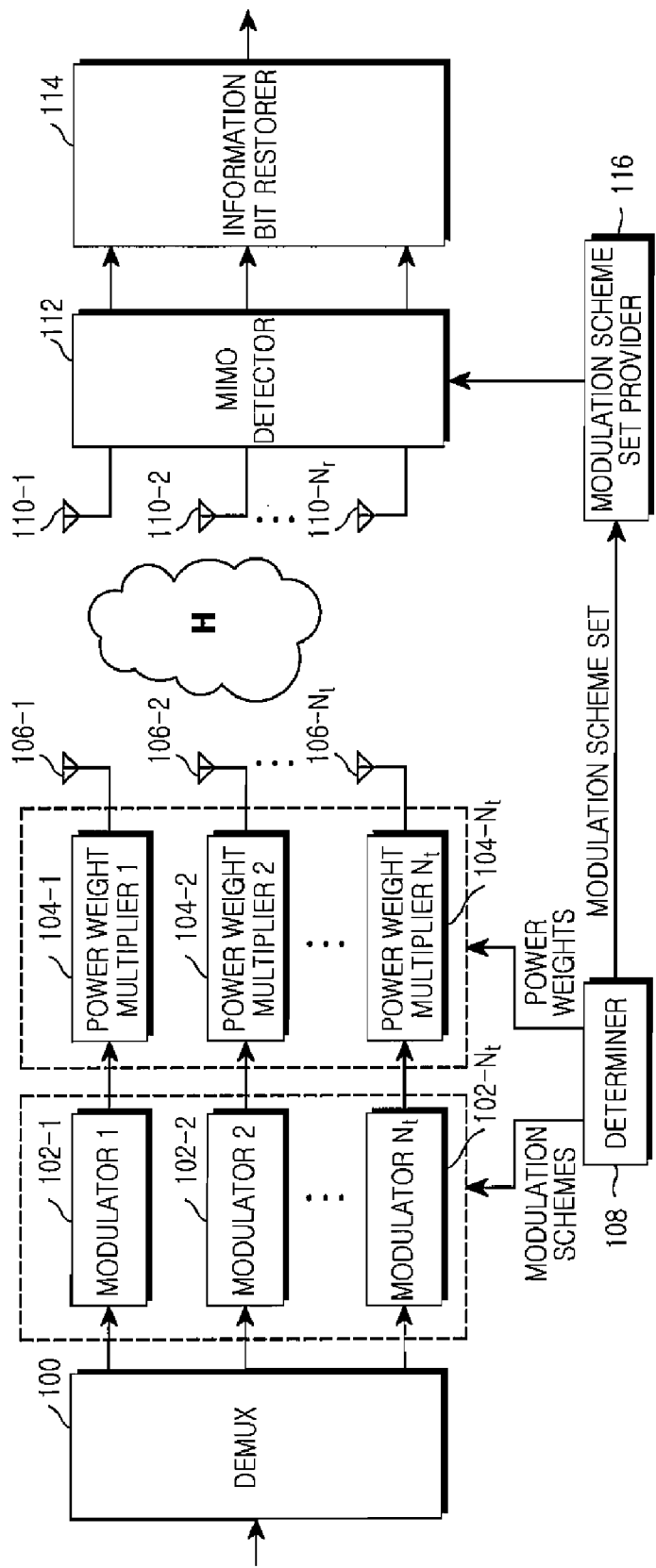
FIG. 1 illustrates a transmitter and a receiver in an SM system according to an exemplary embodiment of the present invention.

FIG. 1 illustrates a transmitter and a receiver in an SM system according to an exemplary embodiment of the present invention.

The transmitter of FIG. 1 includes a demultiplexer (DEMUX) 100, modulators 102-1 through 102-$N_t$, power weight multipliers 104-1 through 104-$N_t$, antennas 106-1 through 106-1 $N_t$, and a determiner 108. The receiver includes antennas 110-1 through 110-$N_r$, a Multiple Input Multiple Output (MIMO) detector 112, an information bit restorer 114, and a modulation scheme set provider 116.

In an exemplary embodiment, the DEMUX 100 of the transmitter generates $N_T$-ary transmit streams by demultiplexing the incoming transmit data. The data input to the DEMUX 100 may be channel-coded data. The DEMUX 100 may comprise any other device performing the SM.

In an exemplary embodiment, the determiner 108 contains a modulation scheme set and a power weight set calculated using an algorithm of FIG. 2, which will be explained later, as a look-up table. In another exemplary embodiment, the determiner 108 may directly determine a modulation scheme set and a power weight set required for the communications using the algorithm of FIG. 2. In an exemplary transmission of data, the determiner 108 confirms the modulation scheme set and the power weight set corresponding to given conditions (i.e. spectral efficiency and the number of transmit antennas) by accessing the look-up table, provides the modulation block 102 with control information according to the modulation scheme set, and provides the power weight multiplier block 104 with control information according to the power weight set.

In an exemplary embodiment, the determiner 108 informs a corresponding receiver of information relating to the selected modulation scheme set. In an exemplary method, if modulation schemes in the modulation scheme set are mapped to the transmit antennas in order starting from the lowest order, the information relating to the modulation scheme set is provided to the receiver only one time when an initial signaling is exchanged. In another exemplary method, if the modulation schemes of the modulation scheme set are mapped to the transmit antennas adaptively according to the channel condition, every change of the mapping relationship between the transmit antennas and the modulation schemes should be informed to the receiver.

The modulators 102-1 through 102-$N_t$ modulate and output the respective streams fed from the DEMUX 100 using the corresponding modulation schemes (or the modulation orders) according to the control information (the modulation scheme set) of the determiner 108. In an exemplary embodiment, the modulators 102-1 through 102-$N_t$ output modulation symbols by signal-point mapping the input data to constellation according to the corresponding modulation schemes. For instance, the modulation schemes include Binary Phase Shift Keying (BPSK) which maps one bit (s=1) to one complex signal, Quadrature Phase Shift Keying (QPSK) which maps two bits (s=2) to one complex signal, 8-ary Quadrature Amplitude Modulation (8 QAM) which maps three bits (s=3) to one complex signal, and 16 QAM which maps four bits (s=4) to one complex signal.

The power weight multipliers 104-1 through 104-$N_t$ multiply the modulation data from the corresponding modulators 102-1 through 102-$N_t$ by the corresponding power weights according to the control information of the determiner 108 and transmit the data on the corresponding antennas. Although not shown in FIG. 2, when an Orthogonal Frequency Division multiplexing (OFDM) communication scheme is used by way of example, a plurality of streams output from the power weight multipliers 104-1 through 104-$N_t$ are OFDM-modulated respectively. The OFDM-modulated signals are Radio Frequency (RF)-processed for the over-the-air transmission and then transmitted via the corresponding antennas over the air. In an exemplary embodiment, the transmit vector transmitted on the transmit antennas 106-1 through 106-$N_t$ is $x=[x_1, x_2, \ldots x_{N_t}]$.

In an exemplary receiver, the plurality of the receive antennas 110-1 through 110-$N_r$ receive the signals from the plurality of the transmit antennas 106-1 through 106-$N_t$. As an example, although it is not shown, when the OFDM communication scheme is used, RF signals received on the plurality of the receive antennas 110-1 through 110-$N_r$ are converted to baseband sample data, respectively. The sample data is OFDM-demodulated and then fed to the MIMO detector 112. In an exemplary embodiment, the receive vector fed to the MIMO detector 112 is $y=[y_1, y_2, \ldots y_{N_R}]$.

An exemplary modulation scheme set provider 116 acquires the set of the modulation schemes (the modulation scheme set) applied to the transmit antennas 106-1 through 106-$N_t$ of the transmitter from the signaling information received from the transmitter and provides the MIMO detector 112 with the information relating to the acquired modulation scheme set.

An exemplary MIMO detector 112 estimates and outputs the transmit vector x by demodulating the incoming receive vector y using the tree searching based detection algorithm. The tree searching based detection algorithm may include a QRD-M algorithm, a chase decoding algorithm, and the like. In an exemplary method, the MIMO detector 112 detects the receive signal by allocating the symbol of the low modulation order to the upper tree level and the symbol of the high modulation order to the lower tree level according to the control information (the modulation scheme set) obtained from the modulation scheme set provider 116. In doing so, the number of survivor branches at each tree level is properly set. As an example, the survivor branch number set with respect to the modulation scheme set can be defined at the system design phase. Also, the receiver can flexibly adjust the survivor branch number set depending on the current status (e.g., channel condition). As such, by reducing the maximum number of branches to be visited at the upper tree level, the complexity can be lowered and performance close to that obtained by the ML scheme can be achieved. Meantime, the data output from the MIMO detector 112 may be Log Likelihood Ratio (LLR) data.

The information bit restorer 116 restores the original information bit string by channel-decoding the data from the MIMO detector 112.

Figure 2:
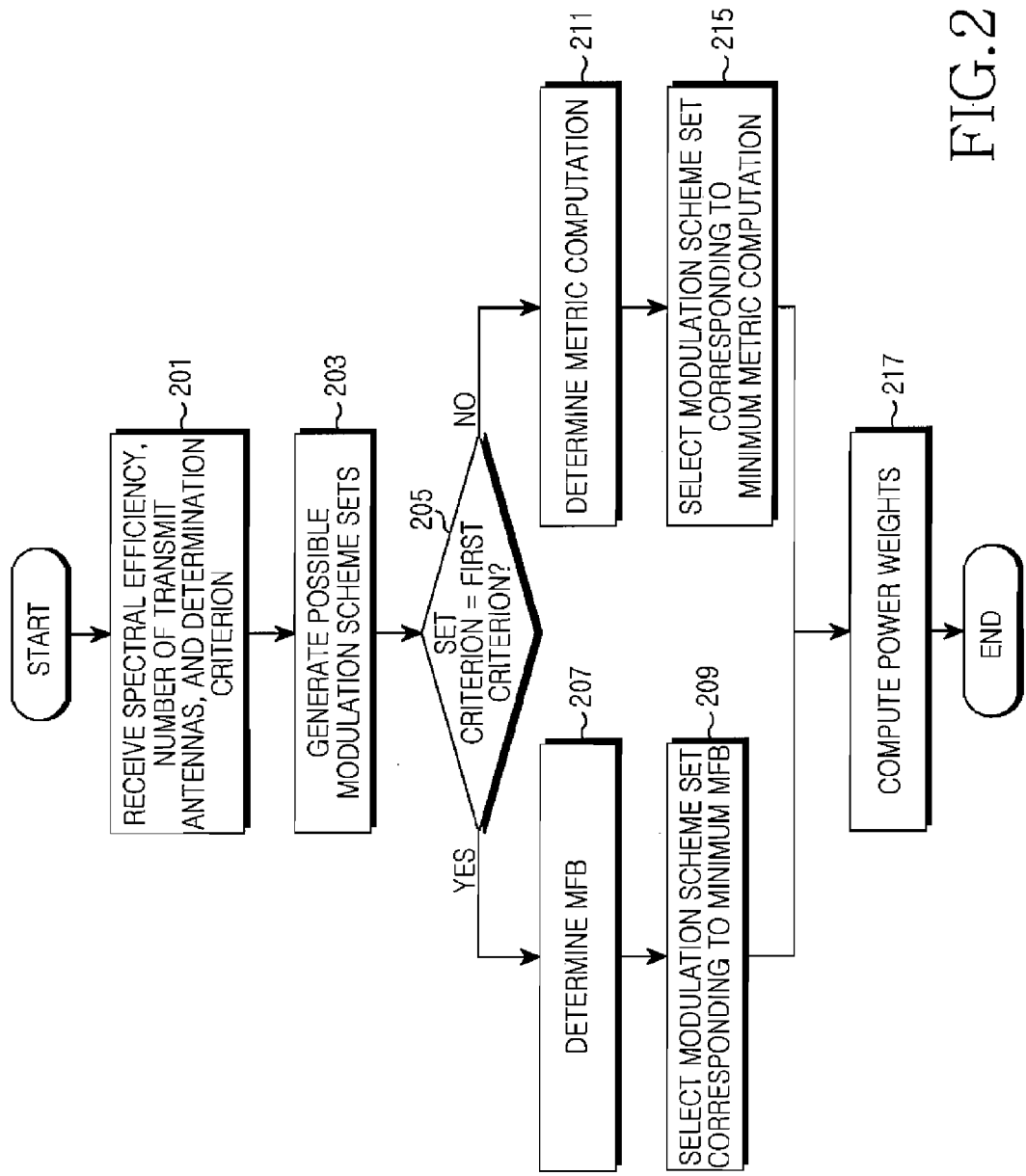
FIG. 2 illustrates a method for determining modulation orders and power weights according to an exemplary embodiment of the present invention.

FIG. 2 illustrates a method for determining modulation orders and power weights according to an exemplary embodiment of the present invention. In an exemplary embodiment, the determiner 108 carries out the following algorithm.

In an exemplary method illustrated in FIG. 2, the determiner 108 receives the spectral efficiency (SE), the number of the transmit antennas ($N_t$: # of TX ants), and the determination criterion (Decision_Rule: A or B) in step 201. As an example, those input parameters may be defined at the system design phase or may be changed during system operation.

In step 203, the determiner 108 generates possible modulation scheme sets by taking into account the number of the transmit antennas. Sets including the same modulation schemes are excluded from the set constitution. In step 205, the determiner 108 determines whether the determination criterion is "A".

In an exemplary embodiment, when the determination criterion is "A", the determiner 108 determines Matched Filter Bound (MFB) with respect to the modulation scheme sets in step 207. The MFB computation calculates Pairwise Error Probability (PEP) when a specific modulation scheme set is used. The MFB computation may be performed using any of the well-known methods.

After computing the MFB for each modulation scheme set, the determiner 108 selects the smallest value by comparing the computed MFB values and determines a modulation scheme set corresponding to the smallest value for the modulation scheme set to be used for the actual data transmission in step 209. The modulation scheme set is selected based on the MFB in order to select a modulation scheme set having the minimum performance degradation.

By contrast, when the determination criterion is "B", the determiner 108 determines a metric computation for each modulation scheme set in step 211. After determining the metric computation for each modulation scheme set, the determiner 108 selects the smallest value by comparing the calculated metric computations and determines a modulation scheme set corresponding to the smallest value for the modulation scheme set to be used for the actual data transmission in step 215. The modulation scheme set is determined based on the metric computation in order to select a modulation scheme set having minimum complexity.

In the above examples, the modulation scheme set is selected based on the MFB when the performance is of interest, or based on the metric computation when the complexity is of interest.

After determining the modulation scheme set, the determiner 108 computes a power weight set which minimizes the Bit Error Rate (BER) in step 217. Minimization of the BER is explained in greater detail below.

Typically, since the closed BER expression for the ML is not widely known, the power weight can not be computed as a theoretical value. Because the MFB has the same properties as the ML except for an inappreciable difference of Signal to Noise Ratio (SNR), the power allocation is transformed to an optimization based on the MFB as expressed as Equation (1).

$$J(P_1, P_2, \ldots, P_N, \lambda) = \frac{1}{N_t} \sum_{i=1}^{N_t} \alpha_i (1 + \beta_i \gamma_i P_i)^{-N_r} + \lambda \left( \sum_{i=1}^{N_t} P_i - N_t \right) \quad (1)$$

$$\Rightarrow \text{Min } J(P_1, P_2, \ldots, P_N, \lambda)$$

In Equation (1), $N_t$ is the number of the transmit antennas, $N_r$ is the number of the receive antennas, $\alpha_i$ and $\beta_i$ are weights according to the modulation schemes, $\gamma_i$ is a bit to noise ratio (true to every antenna) of the i-th receive antenna, $P_i$ is a power weight of the i-th transmit antenna, and $\lambda$ is a Lagrange multiplier.

By applying the partial differential to Equation (1), Equation (2) can be obtained.

$$\frac{\partial J(P_1, P_2, \ldots, P_{N_t}, \lambda)}{\partial P_i} = -\frac{\alpha_i N_r \beta_i \gamma_i}{N_t} (1 + \beta_i \gamma_i P_i)^{-N_r - 1} + \lambda = 0 \quad (2)$$

$$\frac{\partial J(P_1, P_2, \ldots, P_{N_t}, \lambda)}{\partial \lambda} = \sum_{i=1}^{N_t} P_i - N_t = 0$$

The solution of Equation (2) can be expressed as Equation (3), and can be approximated as Equation (4) when the SNR increases.

$$P_i = \frac{1}{\beta_i \gamma_i} \left( \left( 1 + \beta_1 \gamma_1 P_1 \left( \frac{\alpha_i \beta_i \gamma_i}{\alpha_1 \beta_1 \gamma_1} \right)^{\frac{1}{(N_r+1)}} \right) - 1 \right) \text{ and } \sum_{i=1}^{N_t} P_i = N_t \quad (3)$$

$$P_i = \frac{1}{\beta_i \gamma_i} \left( \left( 1 + \beta_1 \gamma_1 P_1 \left( \frac{\alpha_i \beta_i \gamma_i}{\alpha_1 \beta_1 \gamma_1} \right)^{\frac{1}{(N_r+1)}} \right) - 1 \right) \quad (4)$$

$$\approx P_1 \left( \frac{\beta_1 \gamma_1}{\beta_i \gamma_i} \right) \left( \frac{\alpha_i \beta_i \gamma_i}{\alpha_1 \beta_1 \gamma_1} \right)^{\frac{1}{(N_r+1)}}$$

In the above equations, $N_r$ is the number of the receive antennas, $\alpha_i$ and $\beta_i$ are weights according to the modulation schemes, $\gamma_i$ is a bit to noise ratio (true to every antenna) of the i-th receive antenna, and $P_i$ is a power weight of the i-th transmit antenna.

Figure 3:
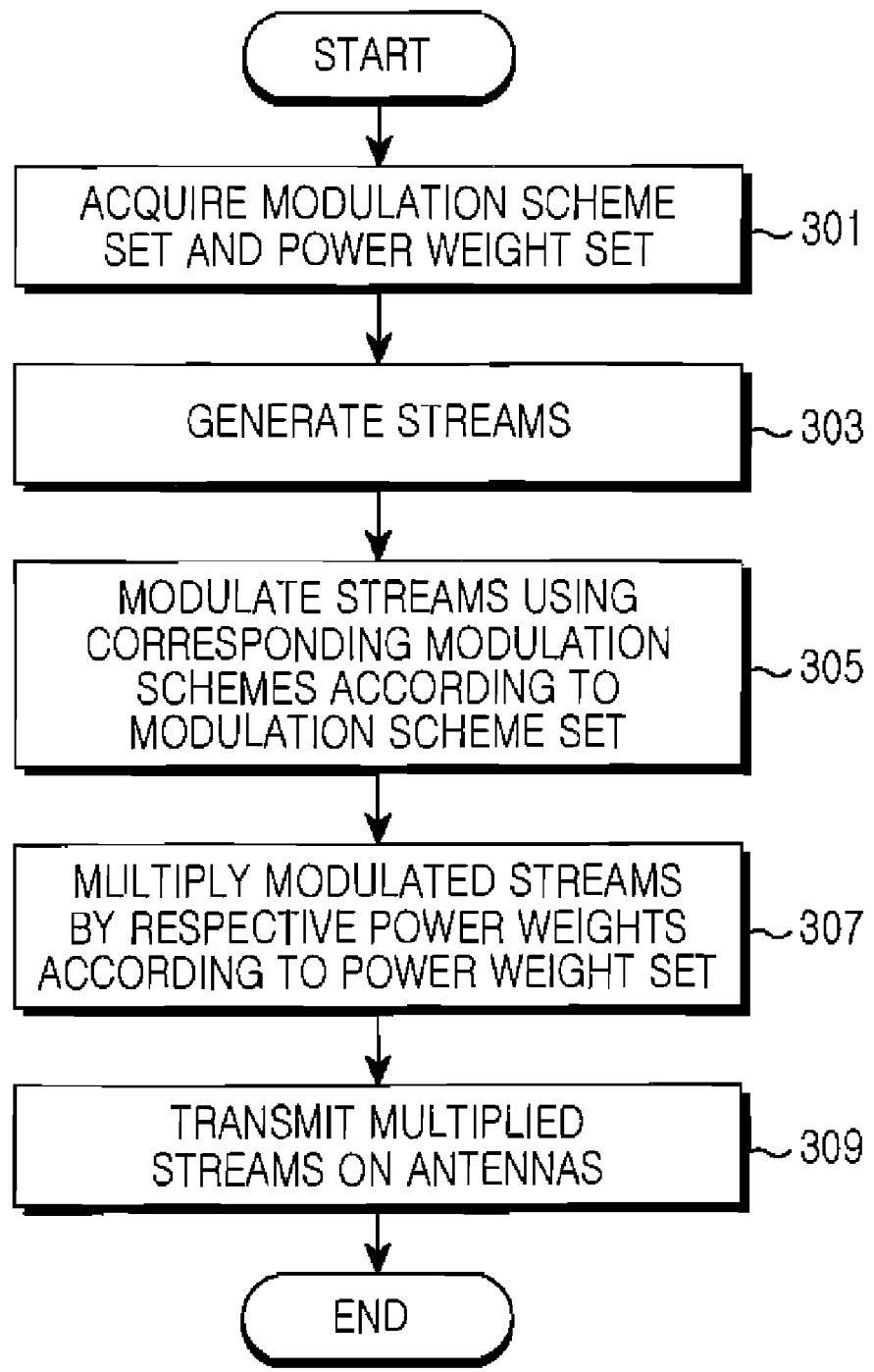
FIG. 3 illustrates a method for transmitting signals in an SM system according to an exemplary embodiment of the present invention.

FIG. 3 illustrates a method for transmitting signals in an SM system according to an exemplary embodiment of the present invention.

In FIG. 3, the transmitter acquires the modulation scheme set and the power weight set to be used in step 301. As an example, the transmitter may include a look-up table of modulation scheme sets and power weight sets according to the spectral efficiency and the transmit antennas in advance, and determine the modulation scheme set and the power weight set to be used by accessing the look-up table. In step 303, the transmitter generates a plurality of transmit streams to be sent on the plurality of the antennas. In step 305, the transmitter modulates the streams using the corresponding modulation schemes according to the modulation scheme set.

In an exemplary embodiment, the modulation schemes of the modulation scheme set may be mapped to the transmit antennas (the streams) in sequence starting from the low-order modulation scheme. In another exemplary embodiment, the modulation schemes may be adaptively mapped to the transmit antennas according to the channel conditions. In other words, the transmit stream sent on the first antenna may use the modulation scheme of the lowest order, or the modulation scheme of the higher order according to the channel condition.

After modulating the streams using the corresponding respective modulation schemes, the transmitter multiplies the modulated streams by the respective power weights according to the power weight set in step 307. That is, the transmitter adjusts gains of the streams according to the power weight set. In step 309, the transmitter processes the multiplied streams in conformity to the transmission protocol and transmits the processed streams on the plurality of antennas. As an example, when an OFDM communication scheme is used, the streams multiplied by the power weights are OFDM-modulated, and the OFDM-modulated signals are RF-processed to fit the over-the-air transmission and transmitted on the corresponding antennas over the air.

Figure 4:
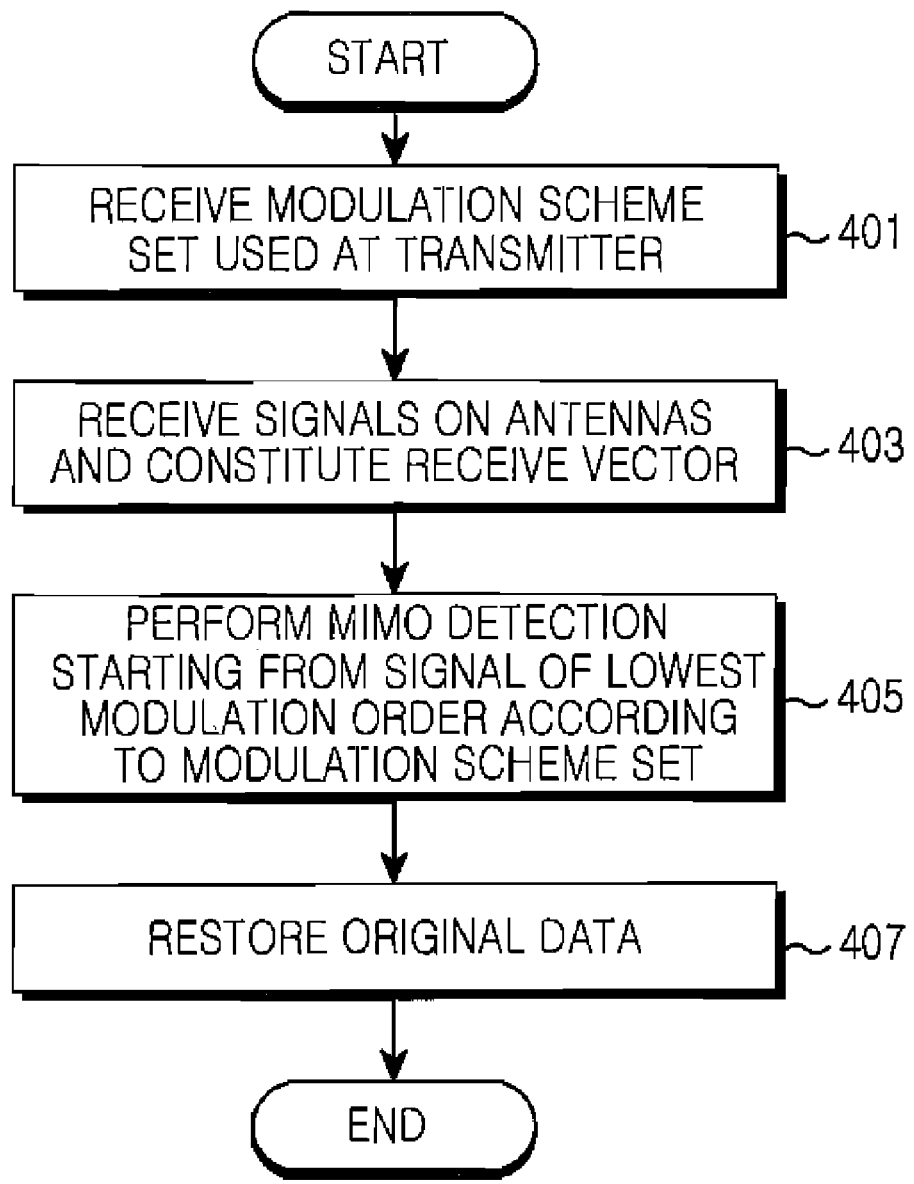
FIG. 4 illustrates a method for receiving signals in an SM system according to an exemplary embodiment of the present invention.

FIG. 4 illustrates a method for receiving signals in an SM system according to an exemplary embodiment of the present invention.

In FIG. 4, the receiver receives the set information of the modulation schemes (the modulation scheme set) applied to the transmit antennas (or the streams) of the transmitter in step 401. The receiver constitutes the receive vector y from the signals received on the plurality of the antennas in step 403.

Upon constituting the receive vector, the receiver estimates the transmit vector x by demodulating the receive vector using the tree searching based detection algorithm in step 405. In doing so, according to the modulation scheme set used at the transmitter, the receiver allocates the symbol of the low modulation order to the upper tree level and the symbol of the higher modulation order to the lower tree level, to thus perform the MIMO detection. The number of the survivor branches at each level is properly set. As an example, the survivor branch number set for the modulation scheme set can be defined at the system design phase. As another example, the survivor branch number set for the modulation scheme set can be flexibly adjusted by the receiver based on the current status (e.g., channel condition).

In step 407, the receiver restores the original information bit string by channel-decoding the estimated data.

Now, simulation results of the present invention are explained.

As an example, it is assumed that the spectral efficiency is 16 bps/Hz, four transmit antennas are used, and the bit to noise ratio is 16 dB. The modulation scheme set and the power weight set are determined as follows:

MFB criterion: $S_{opt}$=[QPSK 16 QAM 16 QAM 64 QAM]

$P_{opt}$=[0.2770 0.9874 0.9874 1.7482]

Computation criterion: $S_{opt}$=[BPSK 8 PSK 64 QAM 64 QAM]

$P_{opt}$=[0.1243 0.6035 1.6226 1.6226].

Figure 5:
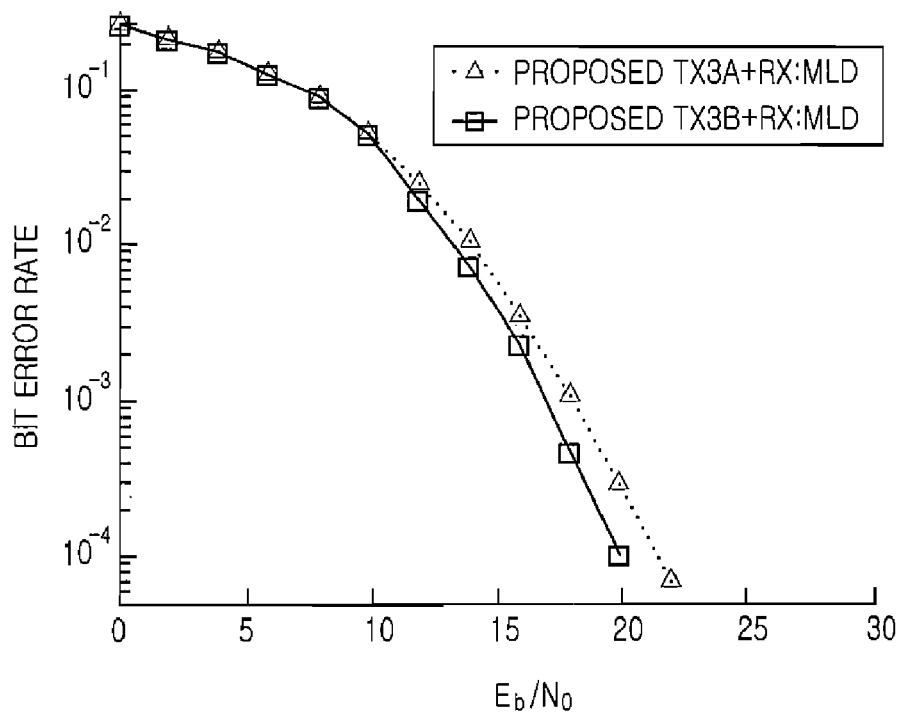
FIG. 5 is a graph illustrating performance when an ML receiver is used in the system according to an exemplary embodiment of the present invention.

FIG. 5 is a graph illustrating performance results when an ML receiver is used in the system according to an exemplary embodiment of the present invention.

The first proposed scheme (Proposed TX3a) illustrated in FIG. 5 indicates the performance when the transmitter uses $S_{opt}$=[QPSK 16 QAM 16 QAM 64 QAM]. The second proposed scheme (Proposed TX3b) graph indicates the performance when the transmitter uses $S_{opt}$=[QPSK 16 QAM 16 QAM 64 QAM] and $P_{opt}$=[0.2770 0.9874 0.9874 1.7482]. As shown, when the open loop power allocation is adopted, performance enhancement of about 1.0 dB can be anticipated.

Figure 6:
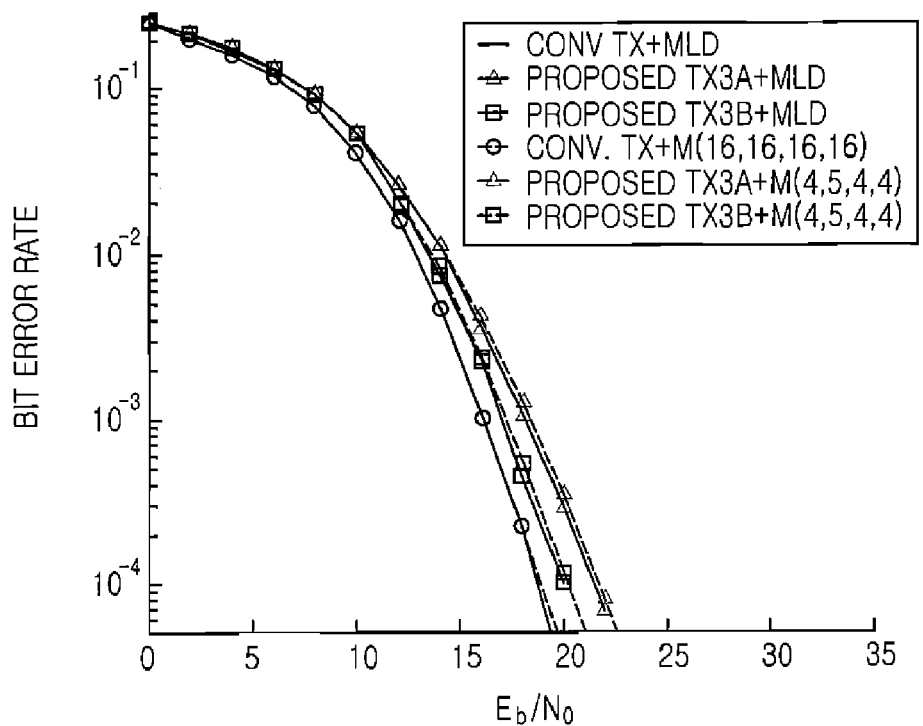
FIG. 6 is a graph illustrating performance when an ML receiver and a QRD-M receiver are used in the system according to an exemplary embodiment of the present invention.

FIG. 6 is a graph illustrating a comparison of performance when the ML receiver and a QRD-M receiver are used in the system according to an exemplary embodiment of the present invention.

MLD is the graph when the ML receiver is used, and M(A1, A2, A3, A4) is the graph when the QRD-M receiver is used. A1 indicates the number of survivor branches at the first level in the tree structure including four levels in total, and A4 indicates the number of survivor branches at the last level. As the Ai value becomes smaller, the performance degradation occurs but the metric computation decreases. Conversely, as the Ai value becomes greater, the performance enhances but the metric computation increases. The conventional transmission method (Conv TX) is conducted when all of the four antennas adopt 16 QAM.

As shown in FIG. 6, exemplary embodiments of the present invention can exhibit performance close to the ML even with a small M value, that is, good performance with low metric computation. In view of the complexity, M(16, 16, 16, 16) has the metric computation of 784, whereas M(4, 5, 4, 4) has the metric computation of 404 which is a reduction of about 50%.

Figure 7:
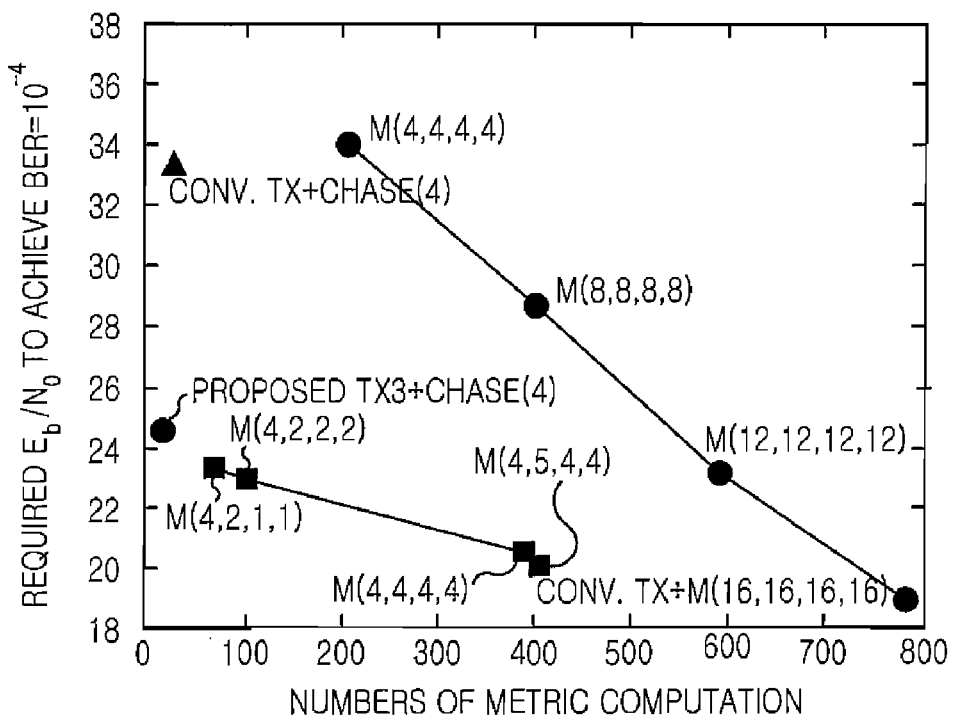
FIG. 7 is a graph illustrating a comparison of performance with complexity.

FIG. 7 is a graph illustrating a comparison of performance with complexity.

The horizontal axis indicates metric computation and the vertical axis indicates the required bit energy to noise ratio (Eb/N0) to achieve the BER $10^{-4}$. Chase(q) indicates the chase decoding having the list size q.

When the metric computation is 400 in FIG. 7, exemplary embodiments of the present invention (i.e. Proposed TX3+M (A1, A2, A3, A4)) exhibit performance gain of about 9.0 dB compared to the conventional method (i.e. Conv. TX+M(A1, A2, A3, A4)). When the bit to noise ratio is 23.5 dB, exemplary embodiments of the present invention can reduce the metric computation by about 88.2% compared to the conventional method. As for Chase(4), the metric computation is reduced by 42.8% and the performance is enhanced to approximately 8.7 dB. In view of the maximum performance, exemplary embodiments of the present invention show performance degradation of about 1.0 dB but reduce the metric computation by about 50%, as compared to the conventional method.

Figure 8:
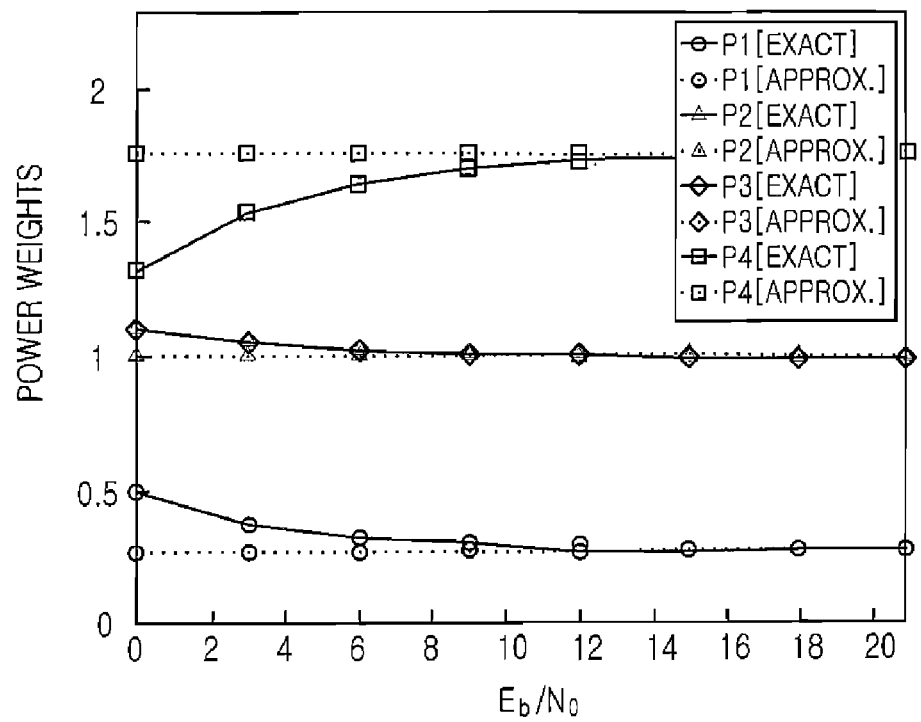
FIG. 8 is a graph illustrating a power weight variation according to Signal to Noise Ratio (SNR).

FIG. 8 is a graph illustrating a power weight variation according to the SNR.

In FIG. 8, [exact] indicates the power weight computed based on Equation (3), and [approx] indicates the power weight computed based on Equation (4). As shown, the power weights are constant at the high SNR (Eb/N0). Thus, performance degradation is minimal even when the transmitter fixes the power weights.

As set forth above, exemplary embodiments of the present invention provide a method for reducing the tree searching complexity at the receiver in an SM communication system. An exemplary transmitter sends the plurality of streams modulated using different modulation schemes, and the receiver detects the signals by allocating the modulation scheme of the lowest order to the upper tree level. Therefore, the tree searching complexity can be lowered and the performance can be enhanced. When an exemplary transmitter of the present invention and a QRD-M receiver are adopted, the metric computation is reduced by about 50% and performance enhancement of about 9.0 dB can be obtained. When the Chase based receiver is adopted, the metric computation can be reduced by 48.2% and the performance enhancement of about 8.7 dB can be achieved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A transmitting apparatus in a Spatial Multiplexing (SM) communication system comprising:
   a generator for generating a plurality of transmit streams by spatial-multiplexing;
   a determiner for determining at least two modulation schemes to be respectively applied to the plurality of the transmit streams and for determining power weights to be respectively applied to the plurality of the transmit streams; and
   a modulator for modulating the plurality of the transmit streams using the at least two modulation schemes under control of the determiner,
   wherein the determining of the power weights is according to the determined at least two modulation schemes,
   wherein the at least two modulation schemes and the power weights to be respectively applied to the plurality of transmit streams are acquired from a look-up table,
   wherein the modulation schemes to be respectively applied to the plurality of the transmit streams comprise modulation schemes determined in accordance with a spectral efficiency and a number of transmit antennas, and
   wherein the determiner generates possible modulation scheme sets which exclude sets including the same modulation schemes and selects a modulation scheme set by comparing values for each modulation scheme set and by selecting a modulation scheme set corresponding to a smallest value.

2. The transmitting apparatus of claim 1, further comprising:
   a power weight multiplier for multiplying the plurality of the transmit streams by corresponding power weights as determined by the determiner.

3. The transmitting apparatus of claim 1, further comprising:
   a baseband processor for Orthogonal Frequency Division Multiplexing (OFDM)-modulating the plurality of the transmit streams; and
   a Radio Frequency (RF) processor for respectively transmitting a plurality of signals from the baseband processor as RF signals.

4. The transmitting apparatus of claim 1, wherein the modulator
   modulates a first transmit stream transmitted on a first antenna using a modulation scheme of a lowest order, and modulates at least one remaining transmit stream using a modulation scheme of a higher order.

5. The transmitting apparatus of claim 1, wherein the modulation schemes to be respectively applied to the plurality of the transmit streams comprise a modulation scheme based on at least one of a Matched Filter Bound (MFB) and a metric computation.

6. The transmitting apparatus of claim 1, wherein the determiner transmits the at least two modulation schemes respectively applied to the plurality of the transmit streams to a receiving apparatus.

7. The transmitting apparatus of claim 1, wherein the power weights to be respectively applied to the plurality of the transmit streams comprise power weights based on the following equation:

$$P_i = \frac{1}{\beta_i \gamma_i}\left(\left(1 + \beta_1 \gamma_1 P_1 \left(\frac{\alpha_i \beta_i \gamma_i}{\alpha_1 \beta_1 \gamma_1}\right)^{\frac{1}{(N_r+1)}} - 1\right)\right)$$

$$\approx P_1 \left(\frac{\beta_1 \gamma_1}{\beta_i \gamma_i}\right)\left(\frac{\alpha_i \beta_i \gamma_i}{\alpha_1 \beta_1 \gamma_1}\right)^{\frac{1}{(N_r+1)}}$$

where $N_r$ is a number of receive antennas,
$\alpha_i$ and $\beta_i$ are weights according to the at least two modulation schemes,
$\gamma_i$ is a bit to noise ratio of an i-th receive antenna, and
$P_i$ is a power weight of an i-th transmit antenna.

8. A receiving apparatus of a Spatial Multiplexing (SM) communication system comprising:
a receiver for receiving at least two modulation schemes in a modulation scheme set, applied to a plurality of streams; and
a detector for allocating a modulation scheme of a lowest order, from among the at least two modulation schemes, to a first level of a tree, for allocating a modulation scheme of a higher order to a remaining level of the tree, and for estimating a transmit vector by detecting signals received on a plurality of antennas using the tree,
wherein the modulation schemes to be respectively applied to the plurality of the streams comprise modulation schemes determined in accordance with a spectral efficiency and a number of transmit antennas, and
wherein the modulation scheme set is determined by comparing values for each modulation scheme set which exclude set including the same modulation schemes and by selecting a modulation scheme set corresponding to a smallest value.

9. The receiving apparatus of claim 8, wherein a Multiple Input Multiple Output (MIMO) algorithm using the tree comprises at least one of a QR Decomposition based M (QRD-M) algorithm and a chase decoding algorithm.

10. The receiving apparatus of claim 8, wherein a number of survivor branches at each tree level corresponds to an allocated modulation scheme of the at least two modulation schemes for each tree level, respectively.

11. The receiving apparatus of claim 8, wherein a number of survivor branches at each tree level corresponds to a channel condition.

12. The receiving apparatus of claim 8, further comprising:
a Radio Frequency (RF) processor for converting the signals received on the plurality of the antennas to baseband signals;
an Orthogonal Frequency Division Multiplexing (OFDM) demodulator for OFDM-demodulating the baseband signals from the RF processor and providing the demodulated signals to the detector; and
a restorer for restoring original data by channel-decoding data from the detector.

13. The receiving apparatus of claim 8, wherein the at least two modulation schemes are received from a transmitting apparatus.

14. A transmitting method in a Spatial Multiplexing (SM) communication system, the method comprising:
generating a plurality of transmit streams by spatial-multiplexing;
determining at least two modulation schemes to be respectively applied to the plurality of the transmit streams;
determining power weights to be respectively applied to the plurality of the transmit streams, according to the determined at least two modulation schemes; and
modulating the plurality of the transmit streams using the at least two determined modulation schemes,
wherein the at least two modulation schemes and the power weights to be respectively applied to the plurality of the transmit streams are acquired from a look-up table,
wherein the at least two modulation schemes to be respectively applied to the plurality of the transmit streams comprise a modulation scheme determined in accordance with at least one of a spectral efficiency and a number of transmit antennas, and
wherein the determining of the at least two modulation schemes comprises generating possible modulation scheme sets which exclude sets including the same modulation schemes and selecting a modulation scheme set by comparing values for each modulation scheme set and by selecting a modulation scheme set corresponding to a smallest value.

15. The transmitting method of claim 14, further comprising:
adjusting gains by multiplying the modulated plurality of transmit streams by corresponding power weights.

16. The transmitting method of claim 14, further comprising:
Orthogonal Frequency Division Multiplexing (OFDM)-modulating the plurality of the transmit streams;
converting the OFDM-modulated signals to Radio Frequency (RF) signals; and
transmitting the RF signals on corresponding antennas.

17. The transmitting method of claim 14, wherein the modulating of the plurality of transmit streams comprises:
modulating a first transmit stream transmitted on a first antenna using a modulation scheme of a lowest order; and
modulating at least one remaining transmit stream using a modulation scheme of a higher order.

18. The transmitting method of claim 14, wherein the at least two modulation schemes respectively applied to the plurality of the transmit streams comprise a modulation scheme corresponding to at least one of a Matched Filter Bound (MFB) and a metric computation.

19. The transmitting method of claim 14, further comprising:
transmitting the at least two modulation schemes respectively applied to the plurality of the transmit streams to a receiving apparatus.

20. The transmitting method of claim 14, wherein the power weights respectively applied to the plurality of the transmit streams are determined based on the following equation:

$$P_i = \frac{1}{\beta_i \gamma_i}\left(\left(1 + \beta_1 \gamma_1 P_1 \left(\frac{\alpha_i \beta_i \gamma_i}{\alpha_1 \beta_1 \gamma_1}\right)^{\frac{1}{(N_r+1)}} - 1\right)\right)$$

$$\approx P_1 \left(\frac{\beta_1 \gamma_1}{\beta_i \gamma_i}\right)\left(\frac{\alpha_i \beta_i \gamma_i}{\alpha_1 \beta_1 \gamma_1}\right)^{\frac{1}{(N_r+1)}}$$

where $N_r$ is a number of receive antennas,
$\alpha_i$ and $\beta_i$ are weights according to the modulation schemes,
$\gamma_i$ is a bit to noise ratio of an i-th receive antenna, and
$P_i$ is a power weight of an i-th transmit antenna.

21. A receiving method of a Spatial Multiplexing (SM) communication system, the method comprising:
receiving at least two modulation schemes in a modulation scheme set applied to a plurality of streams;
allocating a modulation scheme of a lowest order, from among the at least two modulation schemes, to a first level of a tree;
allocating a modulation scheme of a higher order to a remaining level of the tree; and
estimating a transmit vector by detecting signals received on a plurality of antennas using the tree,
wherein the modulation schemes to be respectively applied to the plurality of the streams comprise modulation schemes determined in accordance with a spectral efficiency and a number of transmit antennas, and
wherein the modulation scheme set is determined by comparing values for each modulation scheme set which exclude set including the same modulation schemes and by selecting a modulation scheme set corresponding to a smallest value.

22. The receiving method of claim 21, wherein a Multiple Input Multiple Output (MIMO) algorithm using the tree comprises at least one of a QR Decomposition based M (QRD-M) algorithm and a chase decoding algorithm.

23. The receiving method of claim 21, wherein a number of survivor branches at each tree level corresponds to an allocated modulation scheme.

24. The receiving method of claim 21, wherein a number of survivor branches at each tree level corresponds to a channel condition.

25. The receiving method of claim 21, further comprising:
converting the signals received on the plurality of the antennas to baseband signals;
constituting a receive vector by Orthogonal Frequency Division Multiplexing (OFDM)-demodulating the baseband signals; and
restoring original data by channel-decoding the estimated transmit vector.

26. The receiving method of claim 21, wherein the at least two modulation schemes are received from a transmitting apparatus.

27. The transmitting apparatus of claim 1, wherein the compared values of the possible modulation scheme sets are determined in accordance with Matched Filter Bound (MFB) when a modulation scheme set comprising a minimum performance degradation is desired.

28. The transmitting apparatus of claim 1, wherein the compared values of the possible modulation scheme sets are determined in accordance with a metric computation when a modulation scheme set comprising a minimum complexity is desired.

29. The transmitting method of claim 14, further comprising determining the compared values of the generated possible modulation scheme sets in accordance with Matched Filter Bound (MFB) when a modulation scheme set comprising a minimum performance degradation is desired.

30. The transmitting method of claim 14, further comprising determining the compared values of the generated possible modulation scheme sets in accordance with a metric computation when a modulation scheme set comprising a minimum complexity is desired.

* * * * *